US010067843B1

(12) United States Patent
Yochai et al.

(10) Patent No.: US 10,067,843 B1
(45) Date of Patent: Sep. 4, 2018

(54) SYNCHRONIZING CONTROL NODES AND A RECOVERY FROM A FAILURE OF A PRIMARY CONTROL NODE OF A STORAGE SYSTEM

(71) Applicants: Yechiel Yochai, Moshav Aviel (IL); Sivan Tal, Yifat (IL); Nir Schenkler, Tel Aviv (IL); Mike Dorfman, Herzliya (IL)

(72) Inventors: Yechiel Yochai, Moshav Aviel (IL); Sivan Tal, Yifat (IL); Nir Schenkler, Tel Aviv (IL); Mike Dorfman, Herzliya (IL)

(73) Assignee: INFINIDAT LTD., Herzliya (IL)

( * ) Notice: Subject to any disclaimer, the term of this patent is extended or adjusted under 35 U.S.C. 154(b) by 169 days.

(21) Appl. No.: 15/365,959

(22) Filed: Dec. 1, 2016

(51) Int. Cl.

*G06F 11/00* (2006.01)
*G06F 11/20* (2006.01)
*G06F 13/16* (2006.01)

(52) U.S. Cl.

CPC ...... *G06F 11/2025* (2013.01); *G06F 11/2043* (2013.01); *G06F 11/2069* (2013.01); *G06F 11/2082* (2013.01); *G06F 13/1663* (2013.01)

(58) Field of Classification Search

CPC ............. G06F 11/2025; G06F 11/2043; G06F 11/2069; G06F 11/2082

See application file for complete search history.

(56) References Cited

U.S. PATENT DOCUMENTS 8,335,761 B1 * 12/2012 Natanzon ............ G06F 11/1471 707/626
2017/0357683 A1 * 12/2017 Bumbulis ......... G06F 17/30368

* cited by examiner

*Primary Examiner* — Bryce P Bonzo
*Assistant Examiner* — Katherine Lin
(74) *Attorney, Agent, or Firm* — Reches Patents

(57) ABSTRACT

A method for synchronizing between a primary control node of a storage system and a secondary control node of the storage system, the method may include performing a change in a key-value store that is stored in shared memory of the storage system and includes control metadata for controlling access to data stored in the storage system; the shared memory is accessible to the primary control node and to a secondary control node; generating a change indication that (i) is indicative of the change in the key-value store and (ii) requests the secondary control node to introduce changes in one or more additional data structures that are not stored in the shared memory; the change in the key-value store comprises replacing a previous given value with a current given value that is associated with a given key; sending the change indication to the secondary control node; receiving an acknowledgement from the secondary control node; wherein the acknowledgement indicates at least one of the following: (i) the secondary control node received the change indication and (ii) the secondary control node introduced the changes in the one or more additional data structures that are not stored in the shared memory; and deleting, by the primary control node, the previous given value from the shared memory.

23 Claims, 5 Drawing Sheets

SYNCHRONIZING CONTROL NODES AND A RECOVERY FROM A FAILURE OF A PRIMARY CONTROL NODE OF A STORAGE SYSTEM

BACKGROUND

Mass storage systems may generate a huge amount of control metadata. The control metadata is metadata that is generated by the storage system for managing the objects handled by the storage system, such as metadata that facilitates writing and reading data stored in the system, metadata about logical volumes or snapshots creation and deletion.

The control metadata may include for example, information about address mapping, volumes and snapshots information, journal (logs) about changes, etc.

Committed information is information that is updated as part of a request received from a host that is coupled to the storage system (or from another module of the storage system) and the request was responded with an acknowledgment assuring the handling of the request. Committed information should not be lost, even upon failover (i.e., when a primary control node fails, and the secondary control node takes control from the point of the failure).

A successful failover requires that the secondary control node will have an updated version of control metadata.

When the storage system is structured as a cluster of control nodes, the control metadata needs to be shared or communicated efficiently among the control nodes, to enable the successful failover, or at least to enable other nodes (nodes that did not created the metadata) to provide services that require access to the control metadata.

SUMMARY

There may be provided a method for synchronizing between a primary control node of a storage system and a secondary control node of the storage system, the method may include performing a change in a key-value store that may be stored in shared memory of the storage system and includes control metadata for controlling access to data stored in the storage system; the shared memory may be accessible to the primary control node and to a secondary control node; generating a change indication that (i) may be indicative of the change in the key-value store and (ii) requests the secondary control node to introduce changes in one or more additional data structures that may be not stored in the shared memory; the change in the key-value store may include replacing a previous given value with a current given value that may be associated with a given key; wherein during at least a certain time period the previous given value and the current given value may be concurrently stored within the shared memory at different locations; sending the change indication to the secondary control node; receiving an acknowledgement from the secondary control node; wherein the acknowledgement indicates at least one of the following: (i) the secondary control node received the change indication and (ii) the secondary control node introduced the changes in the one or more additional data structures that may be not stored in the shared memory; and deleting, by the primary control node, the previous given value from the shared memory.

The size of the given value well may exceed a size of the given key.

The change indication points to a location of the current given value in the shared memory.

The additional data structure of the one or more additional data structures maps keys to the location of values within the shared data memory that may be most updated values from a secondary control node point of view.

The method may include sending the change indication to an additional secondary control node of the storage unit; and deleting, by the primary control node, the previous given value from the shared memory only after receiving acknowledgements from the secondary control node and from the additional secondary control node.

The method may include operating the secondary control node as a primary control node upon the failure of the primary control node and a completion of an execution of any instruction included in the change indication.

The method may include performing multiple changes in the key-value store for replacing multiple previous values with multiple current values; generating multiple change indications related to the multiple changes; sending the change indications to the secondary control node; and repetitively (i) receiving an acknowledgement from the secondary control node related to a previous value and a current value of the multiple previous values and the multiple current values; and deleting, by the primary control node, the previous value.

The method may include executing, by the secondary control node and in an order preserving manner instructions included in the multiple change indications.

The executing may start before a failure of the primary control node.

The executing may start only after a failure of the primary control node.

The method may include determining, by the secondary control node, after the secondary control node sent the acknowledgement and upon a failover, which value of the previous given value and the current given value may be a most updated value.

There may be provided a computer program product that may be non-transitory and stores instructions for synchronizing between a primary control node of a storage system and a secondary control node of the storage system, the computer program product may include for: performing a change in a key-value store that may be stored in shared memory of the storage system and includes control metadata for controlling access to data stored in the storage system; the shared memory may be accessible to the primary control node and to a secondary control node; generating a change indication that (i) may be indicative of the change in the key-value store and (ii) requests the secondary control node to introduce changes in one or more additional data structures that may be not stored in the shared memory; the change in the key-value store may include replacing a previous given value with a current given value that may be associated with a given key; wherein during at least a certain time period the previous given value and the current given value may be concurrently stored within the shared memory at different locations; wherein during at least a certain time period the previous given value and the current given value may be concurrently stored within the shared memory at different locations; sending the change indication to the secondary control node; receiving an acknowledgement from the secondary control node; wherein the acknowledgement indicates at least one of the following: (i) the secondary control node received the change indication and (ii) the secondary control node introduced the changes in the one or more additional data structures that may be not stored in the shared memory; and deleting, by the primary control node, the previous given value from the shared memory.

The size of the given value well may exceed a size of the given key.

The change indication points to a location of the current given value in the shares memory.

The additional data structure of the one or more additional data structures maps keys to the location of values within the shared data memory that may be most updated values from a secondary control node point of view.

The computer program product may store instructions for sending the change indication to an additional secondary control node of the storage unit; and deleting, by the primary control node, the previous given value from the shared memory only after receiving acknowledgements from the secondary control node and from the additional secondary control node.

The computer program product may store instructions for operating the secondary control node as a primary control node upon the failure of the primary control node and a completion of an execution of any instruction included in the change indication.

The computer program product may store instructions for performing multiple changes in the key-value store for replacing multiple previous values with multiple current values; generating multiple change indications related to the multiple changes; sending the change indications to the secondary control node; and repetitively (i) receiving an acknowledgement from the secondary control node related to a previous value and a current value of the multiple previous values and the multiple current values; and deleting, by the primary control node, the previous value.

The computer program product may store instructions for executing, by the secondary control node and in an order preserving manner instructions included in the multiple change indications.

The executing may start before a failure of the primary control node.

The executing may start only after a failure of the primary control node.

The computer program product may store instructions determining, by the secondary control node after the secondary control node sent the acknowledgement and upon a failover, which value of the previous given value and the current given value may be a most updated value There may be provided a storage system that may include a shared memory, a primary control node and a secondary control node, wherein the primary control node may be configured to: perform a change in a key-value store that may be stored in the shared memory, wherein the key-value store may include control metadata for controlling access to data stored in the storage system; wherein the shared memory may be accessible to the primary control node and to a secondary control node; generate a change indication that (i) may be indicative of the change in the key-value store and (ii) requests the secondary control node to introduce changes in one or more additional data structures that may be not stored in the shared memory; the change in the key-value store may include replacing a previous given value with a current given value that may be associated with a given key; wherein during at least a certain time period the previous given value and the current given value may be concurrently stored within the shared memory at different locations; send the change indication to the secondary control node; receive an acknowledgement from the secondary control node; wherein the acknowledgement indicates at least one of the following: (i) the secondary control node received the change indication and (ii) the secondary control node introduced the changes in the one or more additional data structures that may be not stored in the shared memory; and delete the previous given value from the shared memory.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
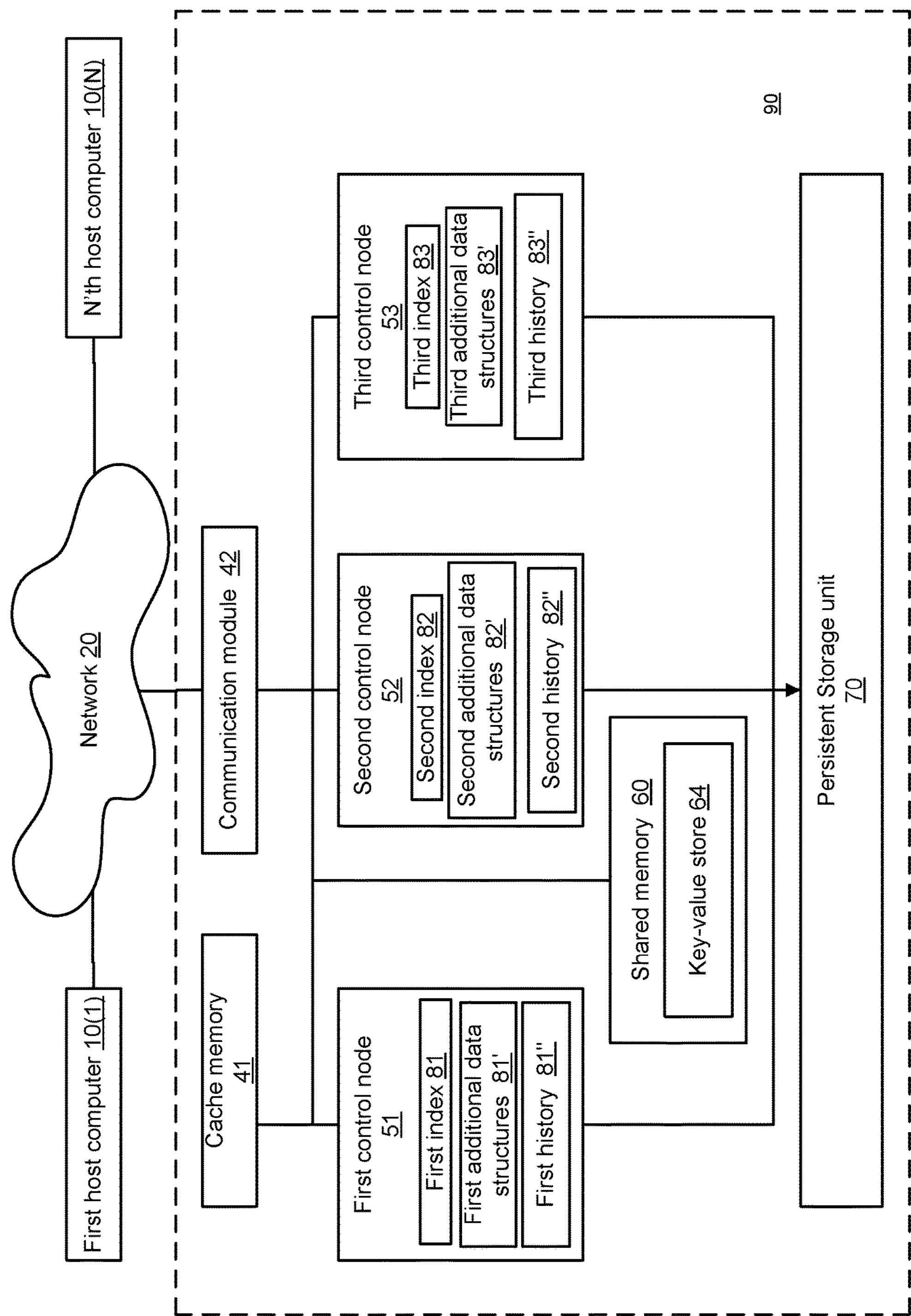
FIG. 1 illustrates an example of a storage system, a network and host computers.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a computer program product that stores instructions that once executed by a computer result in the execution of the method.

Any reference in the specification to a system should be applied mutatis mutandis to a method that may be executed by the system and should be applied mutatis mutandis to a computer program product that stores instructions that may be executed by the system.

Any reference in the specification to a computer program product should be applied mutatis mutandis to a system capable of executing the instructions stored in the computer program product and should be applied mutatis mutandis to method that may be executed by a computer that reads the instructions stored in the non-transitory computer readable medium.

Any change of the control metadata made by one control node in a clustered system can be communicated among all the control nodes. When the control metadata is very large (e.g., more than one terabyte) and is updated quite frequently, communicating the updates among control nodes becomes a bottleneck.

The control metadata can be shared among the control nodes by storing the control metadata on a shared storage (that is accessible to all control nodes). This approach may reduce the communication between the control nodes.

However, it is hard to implement this approach when the updating of the control metadata is part of transactions that perform changes in additional data structures of each control node while preserving the order of updates. In these cases, the primary control node may change the shared control metadata before the secondary node performs corresponding changes in additional data structures, leading to potential inconsistency.

The following storage system and method facilitate managing and sharing control metadata between different control nodes.

The control metadata or part thereof may be arranged as a key-value store where the key is used to search the value. The value can be addressed by a certain key. The term value in this context refers to the content of the object or record, which may contain multiple fields and are addressed by the key.

The key-value store (also referred to as control metadata store) may hold information about a certain aspect of the system, e.g., address mapping of virtual layers of a storage system.

The key may be, for example, a logical address and the value may include a mapping between the logical address and another address. The other address may or may not be a physical address within the persistent storage unit of the storage system. For example, the other address may be mapped to the physical address within the persistent storage unit.

A non-limiting example of a key-value store is illustrated in U.S. Pat. No. 8,918,619. The key-value store is a mapping tree that maps addresses of a certain logical volume. The key may be an address such as a logical block address or a virtual unit address, and the value may be one or more physical addresses associated with the address that serves as a key.

FIG. 1 illustrates storage system 90, network 20 and multiple host computers such as first host computer 10(1) till N'th host computer 10(N). Network 20 is coupled to the storage system 90 and to the host computers.

Shared memory 60 may be a non-volatile memory module such as but not limited to a solid-state disk (SSD) memory and is configured to store key-value store 64.

Shared memory 60 can be accessed by all the control nodes in the cluster, e.g., one control node can change the metadata (key-value store) in the shared memory and other control nodes can read the changed metadata. It is assumed, for simplicity of explanation that the key-value store 64 includes a mapping between logical addresses (exposed to host computers 10(1)-10(N)) and between other addresses—such addresses that are not exposed to the host computers and are "internal" to the storage system 90. A control node may be a server or other computer that controls some of the operations of the storage system. The storage system may be a mass storage system that may store more than 0.5 petabytes.

Storage system 90 is illustrated as including a communication module 42, cache memory 41, shared memory 60, persistent storage unit 70 and a cluster of control nodes that includes first control node 51, second control node 52, third control node 53.

The control nodes may control the operation of the storage system 90. The number of control nodes of the cluster may be two, three or more than three.

Referring to FIG. 1, one of the control nodes operates as a primary control node and the two other control nodes operate as a secondary control node. When the primary control node fails one of the secondary control nodes should replace it.

The primary control node is responsible to control accesses to the key-value store 64 and specifically to control updates of the key-value store 64.

It should be noted that at a given point in time different control nodes may operate as primary control nodes for different parts of the virtual and/or physical memory space and operate as secondary control nodes for other parts of the virtual and/or physical memory space. more, if one of the control nodes is defined as a primary control node with regard to key-value store 64, still the other nodes may serve as a primary control node with regard to other key-value stores, other instances of the key-value store or other types of metadata.

Nevertheless, it is assumed, for simplicity of explanation, that the first control node 51 is a primary control node and that the second and third control nodes 52 and 53 operate as secondary control nodes.

When the primary control node fails one or more of the secondary control nodes performs a failover and takes the role of the primary control node. That secondary control node should be synchronized with the primary control node with regard to at least the content of the key-value store—so that (at least) the committed information should be restored—regardless of the failure of the primary control node.

The synchronization between the primary control node and the secondary control nodes is executed in an efficient manner and dramatically reduces the amount of traffic related to the synchronization, while guaranteeing consistent metadata at the secondary control node at any time, which is necessary for a successful failover that keeps a consistent image of committed information.

The suggested solution minimizes the amount of data that is communicated among the control nodes for synchronizing, while maintaining one or more secondary control nodes updated, so that a failover occurs instantaneously. The solution is particularly efficient when the values are relatively large in size comparing to the size of the key and when the key value store is frequently updated.

Instead of sending the entire values (and keeping duplicates of the entire key-value store in each node), the primary control node sends change indications that inform the secondary nodes about changes in the control metadata that includes a change (related to a value) in the key-value store and one or more additional changes to be made in one or more additional data structures. In order to maintain synchronization and consistency of all the metadata, the secondary node should execute (before or after the failure of the primary node) the changes in the key-value store as well as the one or more additional changes. It is assumed that the control metadata is composed of the key-value store that is stored in the shared memory and one or more additional data structures that includes metadata that need to be updated in conjunction with the key-value store. A copy of the one or more additional data structures is stored in the internal memory of each node and is updated by each node. The primary node may temporarily keep multiple (at least two) versions of at least part of the values, as a result of updating the at least part of the values, and as long as these updates were not acknowledged by the secondary nodes. Each update of a value increases the version of the value and keeps the older version (that has been overwritten) of the value in the key-value store 64, in addition to the new version. In order to maintain the order between change indications and bridge a time gap between the transmission of the change indication and the execution of updates by the secondary control nodes the change indication includes order preserving information such as a version of the value. Accordingly, a key whose value was updated several times (to provide several versions of content that are associated with the same key) is associated with version (or order) information.

A secondary control node, when executing updates indicated by change indication may use the version information to perform the updates according to their order.

The content of the key-value store 64 is accessible to all the control nodes, i.e., one copy of the key-value store is accessible to all the control nodes and there is no need for each control node to update its own copy, nor does the primary control node need to transfer the values to other control nodes.

Each control node may store a history of change indications. The primary control node may store a history of change indications it sent (and for which no acknowledgement was yet received) and each secondary control node may store a history of change indications it received and not yet implemented. The history of change indications may be implemented as a journal file.

In FIG. 1, first control node 51 stores first history 81", second control node 53 stores second history 82" and third control node 53 stores third history 83".

Once all the secondary control nodes acknowledged (to the primary control node) a safe receipt of a certain change indication (a safe receipt may include storing the change indication in the history database or implementing the change), wherein the certain change indication is related to a certain version of a value that is addressed by a certain key—the primary control node may delete from the key-value store 64 any information about previous versions (that preceded the certain version) of the value that is addressed by the certain key. Accordingly—as long as one or more change indication related to a certain key were not acknowledged by all secondary control nodes—the key-value store may store multiple versions of values associated with that certain key.

The certain version of the value that is addressed by the certain key is associated with certain data that is stored in the storage system 90. The mentioned above acknowledgement means that the certain data can be regarded as committed information—and the host computer that is associated with the certain data may be informed that the certain data is committed information.

The version information may have any form. For example, the version information may be a sequence number that is incremented (by a fixed increment, by a variable increment, by a random increment) each time the value is changed.

Looking up a value for a given key, should obtain only the latest version of the value. The older versions are stored temporarily—at least until the secondary nodes indicate that they received and stored more updated versions or at least received the requests to update. The older versions are saved for the sake of being able to revert to an older image of the key-value store.

An index (e.g., dictionary) that translates keys into locations in the shared memory 60 is stored in a memory (for example RAM or persistent memory) of each of the control nodes (see first index 81 of first control node 81, second index 82 of second control node 52 and third index 83 of third control node 53), i.e., each control node stores and updates its own copy of the index, according to update commands coming from the primary control node.

Each control node may also manage, in its internal memory, additional data structures (such as first additional data structures 81' of first control node 51, second additional data structures 82' of second control node 52 and third additional data structures 83' of third control node 53) related to the key-value store, such as free space management of the control metadata store in the shared memory. The additional data structures managed by each control node may contain information that is related to the content (rather than just the structure) stored in the control metadata store, for example: snapshot information, volume creation and deletion that are related and may influent the address mapping.

Each time a value is updated by the primary control node, an entry with the new value is written to a different location within the shared memory and a version of the content of the value is incremented. The old value, now having an older version, is saved in the old location, until the update, which is distributed to the secondary control node(s), is acknowledged by the secondary control node(s).

Thus, the shared memory may temporarily store multiple versions of values for the same key, so as to be able to restore a consistent image of the control metadata store, when the primary control node fails and the secondary control node takes over, by allowing access to an older, yet consistent version.

An entry in the index of the primary control node, that is associated with the key of the value that has been updated, is modified so as to point to the new location in the shared memory, for correlating the key with the new location and new value.

The entries in the index of each secondary control node may be updated up to the last locations that were reported by the primary control node and were implemented by the secondary control node. Thus, at a certain point in time, a certain key in the index of the secondary, may be associated with a second location in the persistent storage, that stores an older version of the value, while the index of the primary control node may be associated with a first location (that differs from the second location) in the persistent storage, that stores a newer version of the value.

Each change indication represents a change in the key-value store and may include an update command for executing a change in the index (so as to point to a new location that stores the new value) as well as commands to execute the one or more additional changes of the one or more additional data structures. The change indication may be indicative of a version that was assigned to the change in the key-value store.

The history may be a journal or one or more queues that may be queued and dequeued in an order preserving manner.

The change indications are managed by the secondary control nodes according to the order of reception. The secondary control node acknowledges the safe reception of a change indication upon at least a safe storing of the change indication in the history.

The primary control node may receive an acknowledgment from all the secondary control nodes (that are target of sent change indications) for a successful reception of a change indication related to certain version of a value associated with a certain key. When these acknowledgments are received then the primary control node may delete, from the history of the primary control node, change indications related to the certain version and any older versions. The primary control nodes may also delete from the history of the control node change indications related to older versions and any acknowledgements from the secondary control nodes related to the older version of the value.

Each secondary control node may scan its history and may update its index and its additional data structures based on the order of reception of change indications stored in its history.

The scanning of the history and the update of the index and additional data structures may occur in any manner—in a continuous manner, in a non-continuous manner, when a predetermined amount of change indications are pending, in response to a request from another entity of the storage system, based on a request from an administrator of the storage system, based on a request before a failure of the primary control node, after the failure of the primary control node, partially before the failure of the primary control node and partially after the failure, and the like.

The execution of the scanning of the history and the update of the index and additional data structures may depend upon the availability of the secondary control node, based on the priority allocated to the scanning of the history and the updates, and the like.

When the primary control node fails, each key of the key value store in the shared memory may appear multiple times with different values and different versions, depending on which updates were applied and acknowledged by the secondary control nodes.

I.e., all the versions that were not acknowledged by the secondary control nodes should appear in the key-value store 43 in the shared memory 60. If all the secondary control nodes are fully synchronized with the primary control node, with regard to a certain key, then the key-value store may store only one version of the certain key.

Upon detecting the failure, the secondary control node takes the role of managing the key-value store. If the history of that secondary control node contains pending updates that were received from the failed primary control node, i.e., updates that were not yet implemented, then the secondary control node scans the history (may play the journal) and implements all the updates in the order they were received.

After playing the journal, a consistent recent version for each key, i.e., a version that is also consistent with the additional updates is obtained.

This consistent recent version may be older than the most recent version that exists in the control metadata store and was written by the primary control node before failure (as some of the updates sent to the secondary by the primary may be lost or not received), but this is a recent version that is also consistent.

Figure 2:
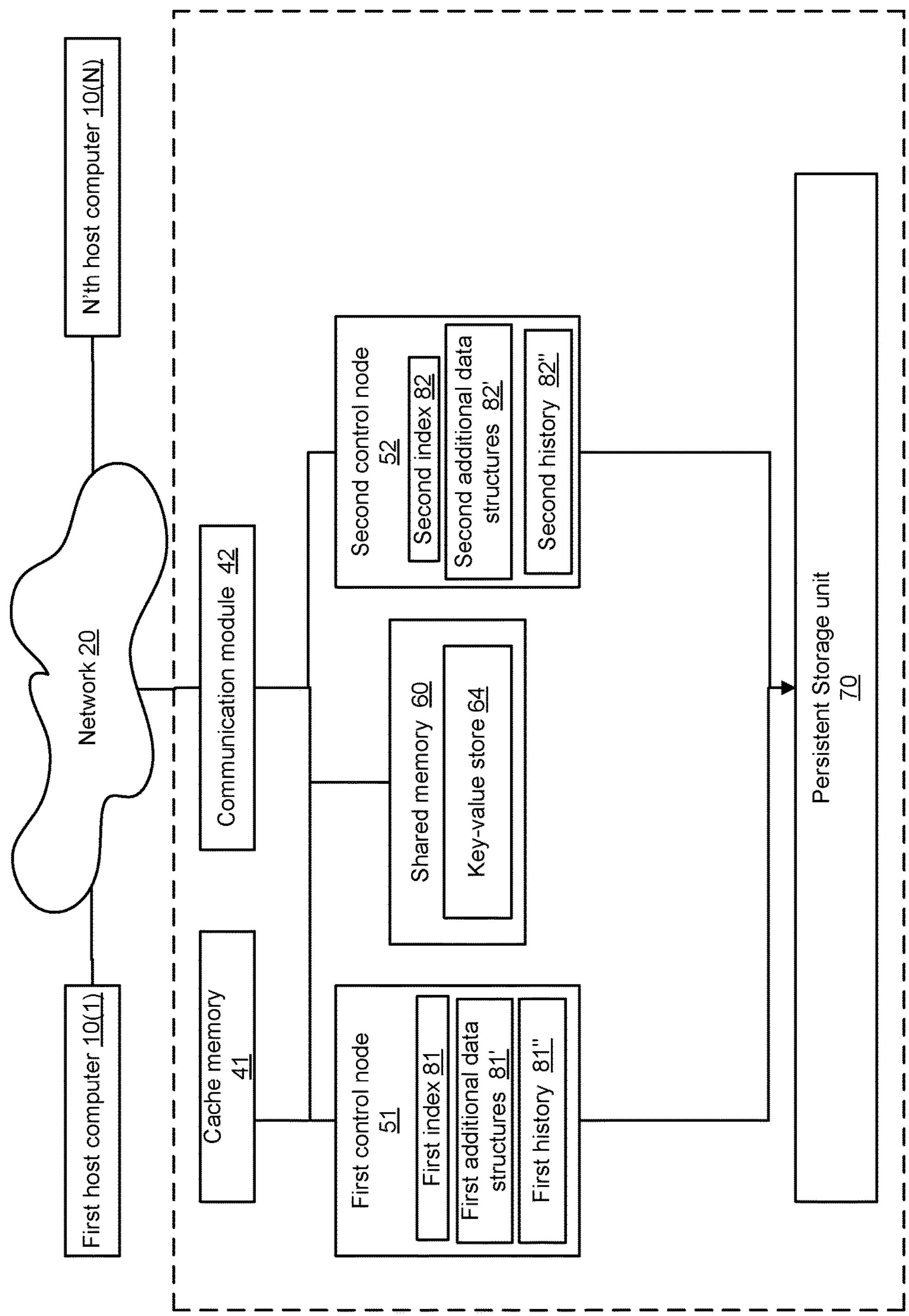
FIG. 2 illustrates an example of a storage system, a network and host computers.

FIG. 2 illustrates a storage system 90 that includes only two control nodes—first control node 51 and second control node 52.

Figure 3:
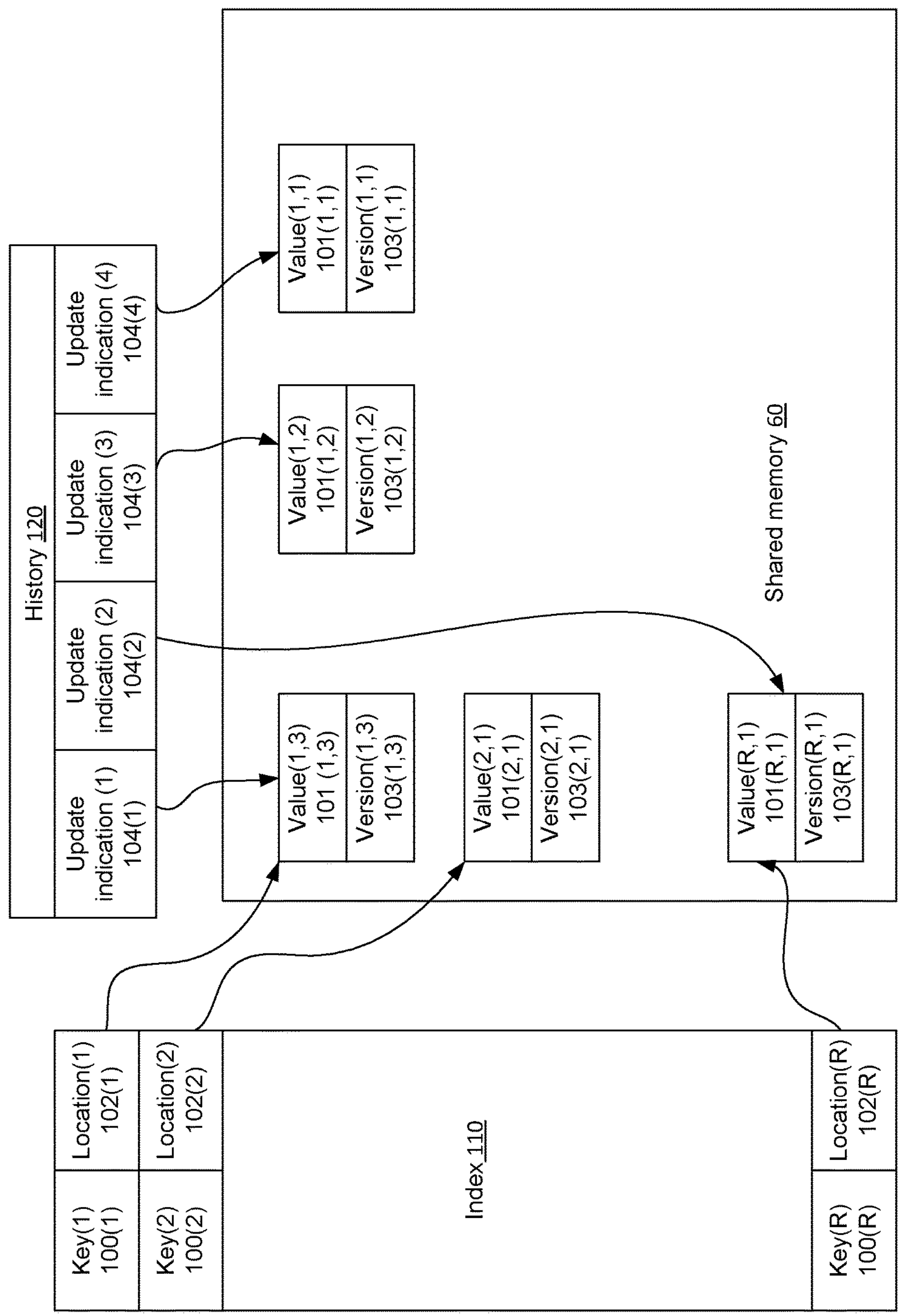
FIG. 3 illustrates an example of a data entities.

FIG. 3 illustrates shared memory 60, an index 110 (which may be first index 81 of first control node 51) and history 120 (which may be first history 82" of first control node 51) of a primary node, such as first control node 51.

Index 110 includes R keys (e.g., key(1) 100(1), key(2) 100(2), until key(R) 100(R)), one key for each of the objects managed by the key-value store, where R is the number of keys (or number of objects) included in the key-value store.

Index 110 includes, for each key, a location in shared memory 60, such as location(1) 102(1) of key(1) 100(1), location(2) 102(2) of key(2) 100(2), up to location(R) 102(R) of key(R) 100(R). The location may be an offset or a pointer pointing to an address within shared memory 60, as indicated by the arrows that start at locations 102.

Shared memory 60 includes various values 101 associated with different keys 100, where values on the left are newer than values on their right. Locations 102 in index 110 points to the most recent version of each value. For example, the most recent version of the value associated with key(1) is version (1,3) of value (1,3). Values (1,2) and (1,1) were associated with key(1) in the past. The instance of each value may be stored along with the key (not shown) that is (or was) associated with the value.

History 120 is illustrated as including four pending update indications, with the older update indications on the right and newer update indications are on the left. The arrows that start in the update indications illustrate their association with values stored in the shared memory. In the primary control node, the update indications are those sent to the secondary node and pending for acknowledgement from the secondary node. A similar data structure (history) exists in the secondary control node but represents received update indications that were not yet handled by the secondary node.

Key(1) 100(1) is (or was) associated with three values: value(1,1) 101(1,1) is the oldest value that was associated with Key(1) and is stored along with a version (1,1) 103(1,1) which indicates an oldest version, for example, a smallest sequence number among the three versions of values of key(1); value(1, 2) 101(1,2) is the a value that was associated with key(1) later than value(1,1) and is stored along with a version (1,2) 103(1,2) which indicates a newer version; and value(1,3) 101(1,3) is the newest and most recent value, which is currently associated with Key(1) and is stored along with a version (1,3) 103(1,3) which indicates a newest version, for example, a largest sequence number among the three versions of values of key(1).

In this example the secondary control node has not acknowledged previous updates of values associated with key(1), therefore key(1) is associated with the three values (1,3), (1,2) and (1,1) that are still stored in shared memory 60. In addition, the three values of three versions are pending in the history 120 that stores pending updates: update indication(4) 104(4) that points to oldest version (1,1), update indication(3) 104(3) that points to version (1,2), and update indication(1) 104(1) that points to the newest version (1,3).

Key(R) 100(R) is associated with one value (R,1) 101(R, 1) and stored along with a location (R,1) 102(R), which points to value (R,1). In this example the secondary control node has not acknowledged the update of value (R,1), and therefore the update indication(2) 104(2) of this value is pending in history 120.

Key(2) 100(2) is associated with one value (2,1) 101(2,1) and stored along with a location (2) 102(2), which points to value (2,1). In this example the secondary control node has already acknowledged the update of value (2,1), and therefore there is no pending item in the history 120.

Figure 4:
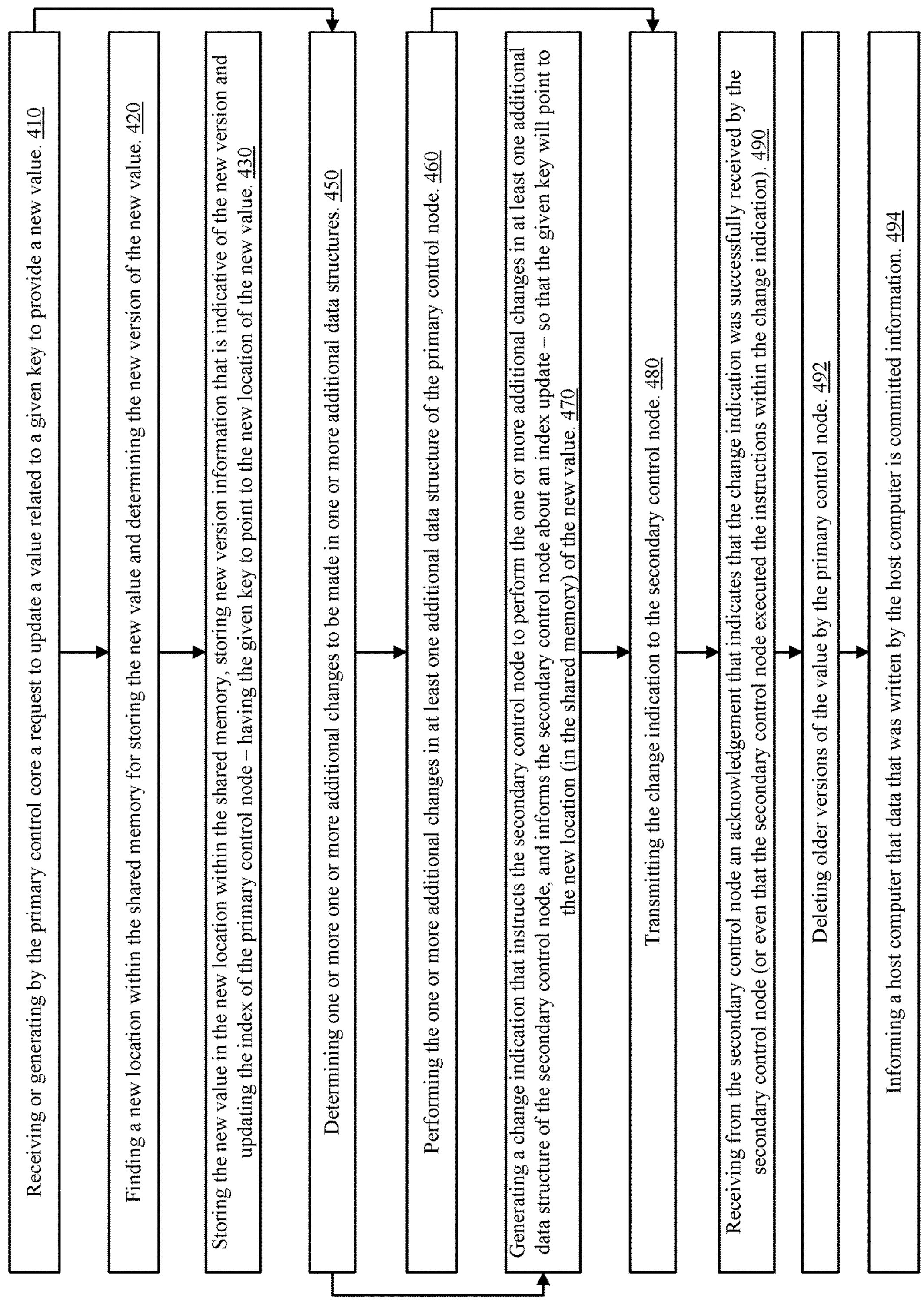
FIG. 4 illustrates an example of a method.

FIG. 4 illustrates a method 400 according to an embodiment of the invention.

It is assumed, for simplicity of explanation, that there is a single secondary control node. If there are multiple secondary control nodes than the method may be applied to all (or some) of the secondary control nodes.

Method 400 is executed by a primary control node and is aimed to synchronize between the primary control node and one or more secondary control nodes.

Method 400 may start by step 410 of receiving or generating by the primary control node a request to update a value related to a given key to provide a new value.

The request may be generated as a result of a write request from a host computer or may be initiated by various internal processes executed by modules of the primary control node or other nodes, wherein the internal processes cause changes for example in the address mapping that is implemented as the key-value store 64. Such internal processes may be for example, defragmentation, data migration, etc.

Step 410 may be followed by steps 420 and 450.

Step 420 may include finding a new location within the shared memory for storing the new value and determining the new version of the new value. The shared memory is accessible by the secondary control node. Step 420 may include using a free space mapping of the shared memory that indicates for each address whether it is allocated or free and the new location may be chosen from one of the free addresses.

Step 420 may be followed by step 430 of storing the new value in the new location within the shared memory, storing new version information that is indicative of the new version and updating the index of the primary control node—having the given key to point to the new location of the new value. The index may be a local data structure that is stored in a local memory of the primary control node that is not shared with the secondary control node.

Step 430 may include preserving the old value stored in the previous location. The preserving may be achieved by avoiding freeing the previous location, e.g., avoiding marking the previous location as free, in the free space mapping. The preserving continues until step 492. Therefore step 430 may cause the existence of multiple versions of the value in the shared memory that are associated with the given key.

Step 450 may include determining one or more additional changes to be made in one or more additional data structures. These one or more additional data structures may be local data structures—data structures that are not stored in the shared memory.

Step 450 may be followed by steps 460 and 470.

Step 460 may include performing the one or more additional changes in at least one additional data structure of the primary control node.

Step 470 may include generating a change indication that instructs the secondary control node to perform the one or more additional changes in at least one additional data structure of the secondary control node, and informs the secondary control node about an index update—so that the given key will point to the new location (in the shared memory) of the new value. The informing may include instructing the secondary control node to update the index of the secondary control node.

Steps 460 and 470 may be followed by step 480 of transmitting the change indication to the secondary control node.

Step 480 may also include updating the history of the primary control node to include a reference to the transmission of the change indication to the secondary control node.

Step 480 may be followed by step 490 of receiving from the secondary control node an acknowledgement that indicates that the change indication was successfully received by the secondary control node (or even that the secondary control node executed the instructions within the change indication).

Step 490 may be followed by steps 492 and 494.

Step 492 may include deleting older versions of the value by the primary control node from the shared memory. The deleting may include marking the location of the older versions as free, in the free space mapping. The older versions preceded a version indicated in the acknowledgement. Step 492 may also include deleting from the history of the primary control node the reference to the transmission of the change indication.

When step 410 is a result of a write request from a host computer then step 494 may include informing a host computer that data that was requested to be written by the host computer is committed information. Step 494 may include informing an internal process that triggered the change that the change is committed.

The committed information will be stored in the persistent storage unit of the storage system.

Figure 5:
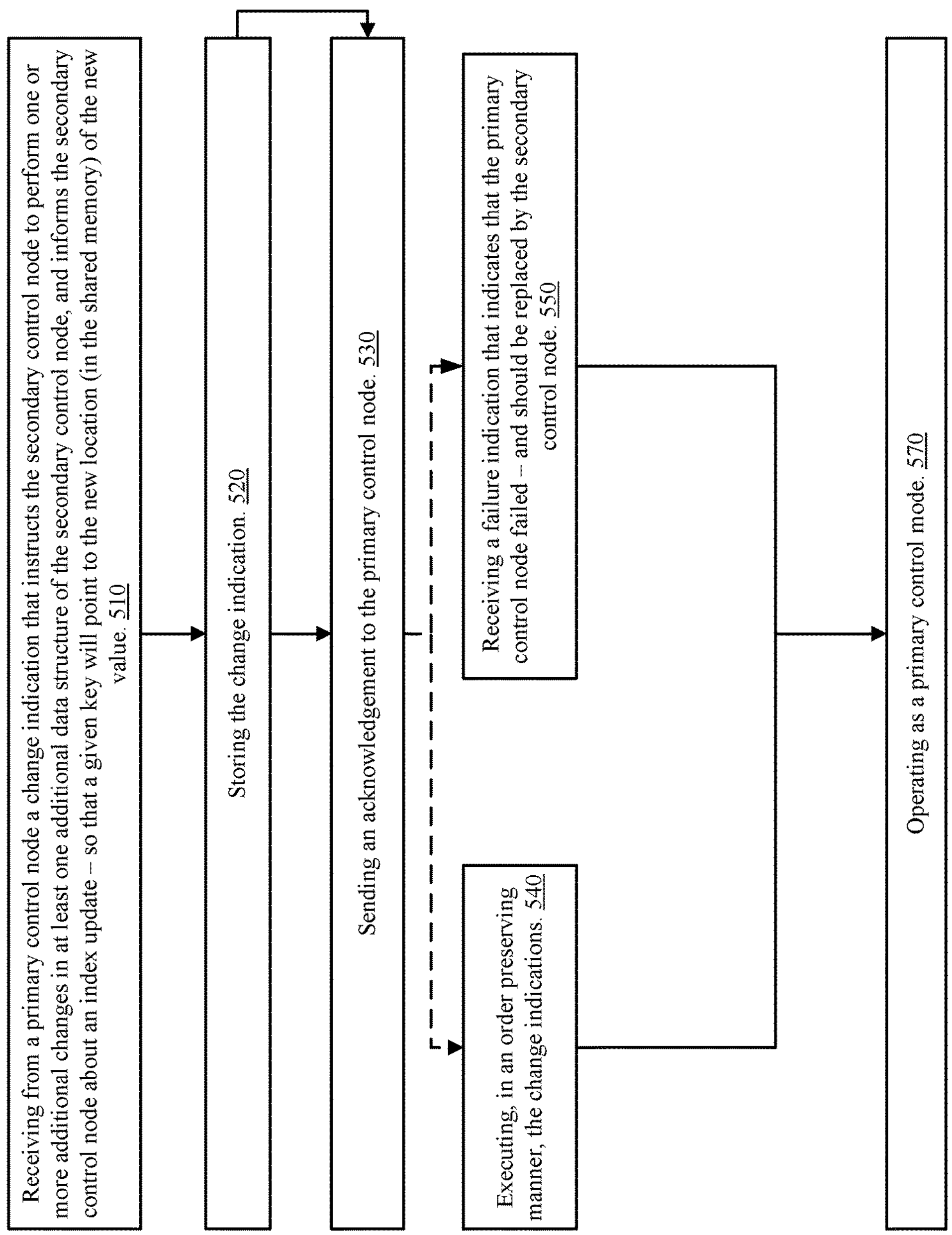
FIG. 5 illustrates an example of a method.

FIG. 5 illustrates a method 500 according to an embodiment of the invention.

It is assumed, for simplicity of explanation, that there is a single secondary control node. If there are multiple secondary control nodes than the method may be applied to all (or some) of the secondary control nodes.

Method 500 is executed by a secondary control node and is aimed to synchronize between the primary control node and one or more secondary control nodes.

Method 500 may start by step 510 of receiving from a primary control node a change indication that instructs the secondary control node to perform one or more additional changes in at least one additional data structure of the secondary control node, and informs the secondary control node about an index update—so that a given key will point to the new location (in the shared memory) of the new value.

Step 510 may be followed by step 520 of storing the change indication. The change indication may be stored in an order preserving manner that preserves the order of generation of the change indications.

Step 520 may be followed by step 530 of sending an acknowledgement to the primary control node.

Step 530 may be followed by steps 540 and 550.

Step 540 may include executing, in an order preserving manner, the change indications. It is noted that the secondary control node may not execute any change indication until the primary control node fails—or may execute at least one change indication before the failure. The execution includes updating a second index in the internal memory of the secondary control node, so that the given key will point to a new location in the shared memory that stores a new value.

Step 550 includes receiving a failure indication that indicates that the primary control node failed—and should be replaced by the secondary control node.

If, at the time of the failure these are still pending (non-executed) change indications then the secondary control node completes the execution of all pending change indications.

Following step 550 and the completion of the execution of step 540 the fail over process ends and method 500 proceeds to step 570 of operating as a primary control mode.

FIG. 6 illustrates method 600 according to an embodiment of the invention.

Method 600 may be executed by a primary control node of a storage system.

Method 600 may start by step 610 of performing a change in key-value store that is stored in shared memory and includes control metadata for controlling access to data stored in the storage system. The shared memory is accessible to the primary control node and to a secondary control node.

The change in the key-value store relates to a given value that is associated with a given key. The change involves generating a current given value. The current given value will eventually replace a previous given value. Step 610 may include concurrently storing, during at least a certain time period, the previous given value and the current given value within the shared memory at different locations. The certain time period may start when the current given value is first stored in the shared memory and ends when the previous given value is deleted from the shared memory.

A size of the given value may well exceed (for example by a factor that may exceed 10, 100, 1000 and the like) a size of the given key.

Step 610 may be followed by step 620 of generating a change indication that (i) is indicative of the change in the key-value store and (ii) requests the secondary control node of the storage system to introduce changes in one or more additional data structures that are not stored in the shared memory. At least one more change in the one or more additional data structures relates to the given key.

The change indication may point to the location of the current given value in the shares memory. An additional data structure may be an index or other data structure that maps keys to the location of what seems to the secondary control node to be the most updated values associated with the keys.

Step 620 may be followed by step 630 of sending the change indication to the secondary control node.

Step 630 may be followed by step 610.

Step 630 may be followed by step 640 of receiving an acknowledgement from the secondary control node. The acknowledgement indicates that the secondary control node received the change indication and/or that the secondary control node introduced the changes in one or more additional data structures that are not stored in the shared memory.

Step 640 may be followed by step 650 of deleting the previous given value from the shared memory.

It should be noted that the primary control node may send multiple change indication before it receives an acknowledgment from the secondary control node.

When there are multiple secondary control nodes the primary control node will delete the previous given value only after receiving acknowledgements (related to the previous given value) from all the secondary control nodes.

When the primary control node fails then the secondary control node may execute instructions related to any change indication that the secondary control node acknowledged but did not execute—and after the completion of this execution the secondary node may by synchronized with the state of the primary control node before the failure—especially synchronized in relation to guaranteed data.

Accordingly—upon failover of the primary control node, the secondary control node may assume at least one of stored values (selected from the given value and the at least one previous value) to be the most updated value associated with the given key, wherein the most updated value assumed by the secondary control node is a most recent value among the stored values that is associated with an acknowledged update indication.

The invention may also be implemented in a computer program for running on a computer system, at least including code portions for performing steps of a method when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer program product that is non-transitory. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms “front,” “back,” “top,” “bottom,” “over,” “under” and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

more, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. more, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for synchronizing between a primary control node of a storage system and a secondary control node of the storage system, the method comprises:

performing a change in a key-value store that is stored in shared memory of the storage system and includes control metadata for controlling access to data stored in the storage system; the shared memory is accessible to the primary control node and to a secondary control node;

generating a change indication that (i) is indicative of the change in the key-value store and (ii) requests the secondary control node to introduce changes in one or more additional data structures that are not stored in the shared memory; the change in the key-value store comprises replacing a previous given value with a current given value that is associated with a given key; wherein during at least a certain time period the previous given value and the current given value are concurrently stored within the shared memory at different locations;

sending the change indication to the secondary control node;

receiving an acknowledgement from the secondary control node; wherein the acknowledgement indicates at least one of the following: (i) the secondary control node received the change indication and (ii) the secondary control node introduced the changes in the one or more additional data structures that are not stored in the shared memory; and deleting, by the primary control node, the previous given value from the shared memory.

2. The method according to claim 1 wherein a size of the given value well exceeds a size of the given key.

3. The method according to claim 1 wherein the change indication points to a location of the current given value in the shared memory.

4. The method according to claim 1 wherein an additional data structure of the one or more additional data structures maps keys to the location of values within the shared data memory that are most updated values from a secondary control node point of view.

5. The method according to claim 1 comprising sending the change indication to an additional secondary control node of the storage unit; and deleting, by the primary control node, the previous given value from the shared memory only after receiving acknowledgements from the secondary control node and from the additional secondary control node.

6. The method according to claim 1 comprising operating the secondary control node as a primary control node upon the failure of the primary control node and a completion of an execution of any instruction included in the change indication.

7. The method according to claim 1 comprising performing multiple changes in the key-value store for replacing multiple previous values with multiple current values; generating multiple change indications related to the multiple changes; sending the change indications to the secondary control node; and repetitively (i) receiving an acknowledgement from the secondary control node related to a previous value and a current value of the multiple previous values and the multiple current values; and deleting, by the primary control node, the previous value.

8. The method according to claim 7 comprising executing, by the secondary control node and in an order preserving manner instructions included in the multiple change indications.

9. The method according to claim 8 wherein the executing starts before a failure of the primary control node.

10. The method according to claim 8 wherein the executing starts only after a failure of the primary control node.

11. The method according to claim 1, comprising determining, by the secondary control node, after the secondary control node sent the acknowledgement and upon a failover, which value of the previous given value and the current given value is a most updated value.

12. A computer program product that is non-transitory and stores instructions for synchronizing between a primary control node of a storage system and a secondary control node of the storage system, the computer program product comprises for:

performing a change in a key-value store that is stored in shared memory of the storage system and includes control metadata for controlling access to data stored in the storage system; the shared memory is accessible to the primary control node and to a secondary control node;

generating a change indication that (i) is indicative of the change in the key-value store and (ii) requests the secondary control node to introduce changes in one or more additional data structures that are not stored in the shared memory; the change in the key-value store comprises replacing a previous given value with a current given value that is associated with a given key; wherein during at least a certain time period the previous given value and the current given value are concurrently stored within the shared memory at different locations;

sending the change indication to the secondary control node;

receiving an acknowledgement from the secondary control node; wherein the acknowledgement indicates at least one of the following: (i) the secondary control node received the change indication and (ii) the secondary control node introduced the changes in the one or more additional data structures that are not stored in the shared memory; and deleting, by the primary control node, the previous given value from the shared memory.

13. The computer program product according to claim 12 wherein a size of the given value well exceeds a size of the given key.

14. The computer program product according to claim 12 wherein the change indication points to a location of the current given value in the shares memory.

15. The computer program product according to claim 12 wherein an additional data structure of the one or more additional data structures maps keys to the location of values within the shared data memory that are most updated values from a secondary control node point of view.

16. The computer program product according to claim 12 storing instructions for sending the change indication to an additional secondary control node of the storage unit; and deleting, by the primary control node, the previous given value from the shared memory only after receiving acknowledgements from the secondary control node and from the additional secondary control node.

17. The computer program product according to claim 12 storing instructions for operating the secondary control node as a primary control node upon the failure of the primary control node and a completion of an execution of any instruction included in the change indication.

18. The computer program product according to claim 12 storing instructions for performing multiple changes in the key-value store for replacing multiple previous values with multiple current values; generating multiple change indications related to the multiple changes; sending the change indications to the secondary control node; and repetitively (i) receiving an acknowledgement from the secondary control node related to a previous value and a current value of the multiple previous values and the multiple current values; and deleting, by the primary control node, the previous value.

19. The computer program product according to claim 18 storing instructions for executing, by the secondary control node and in an order preserving manner instructions included in the multiple change indications.

20. The computer program product according to claim 19 wherein the executing starts before a failure of the primary control node.

21. The computer program product according to claim 19 wherein the executing starts only after a failure of the primary control node.

22. The computer program product according to claim 12 storing instructions determining, by the secondary control node after the secondary control node sent the acknowledgement and upon a failover, which value of the previous given value and the current given value is a most updated value.

23. A storage system that comprises a shared memory, a primary control node and a secondary control node, wherein the primary control node is configured to:

perform a change in a key-value store that is stored in the shared memory, wherein the key-value store comprise control metadata for controlling access to data stored in the storage system; wherein the shared memory is accessible to the primary control node and to a secondary control node;

generate a change indication that (i) is indicative of the change in the key-value store and (ii) requests the secondary control node to introduce changes in one or more additional data structures that are not stored in the shared memory; the change in the key-value store comprises replacing a previous given value with a current given value that is associated with a given key;

wherein during at least a certain time period the previous given value and the current given value are concurrently stored within the shared memory at different locations;

send the change indication to the secondary control node;

receive an acknowledgement from the secondary control node; wherein the acknowledgement indicates at least one of the following: (i) the secondary control node received the change indication and (ii) the secondary control node introduced the changes in the one or more additional data structures that are not stored in the shared memory; and delete the previous given value from the shared memory.

* * * * *